US010875420B2

(12) United States Patent
Grimm et al.

(10) Patent No.: US 10,875,420 B2
(45) Date of Patent: Dec. 29, 2020

(54) FULL-SERVICE CHARGING STATION FOR AN ELECTRIC VEHICLE AND METHOD OF OPERATING THE SAME

(71) Applicant: GM GLOBAL TECHNOLOGY OPERATIONS LLC, Detroit, MI (US)

(72) Inventors: Donald K. Grimm, Utica, MI (US); Xiang Zhao, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/398,965

(22) Filed: Apr. 30, 2019

(65) Prior Publication Data

US 2020/0346553 A1    Nov. 5, 2020

(51) Int. Cl.
*B60L 53/65* (2019.01)
*B60L 53/62* (2019.01)
*B60R 25/24* (2013.01)
*G05D 1/02* (2020.01)
*B60K 6/28* (2007.10)

(52) U.S. Cl.
CPC .............. *B60L 53/65* (2019.02); *B60L 53/62* (2019.02); *B60R 25/24* (2013.01); *G05D 1/0276* (2013.01); *B60K 6/28* (2013.01); *B60Y 2200/91* (2013.01); *B60Y 2200/92* (2013.01); *B60Y 2300/91* (2013.01)

(58) Field of Classification Search
None
See application file for complete search history.

(56) References Cited

U.S. PATENT DOCUMENTS

| 5,563,491 | A | * | 10/1996 | Tseng | B60L 53/68 |
|   |   |   |   |   | 320/109 |
| 5,821,731 | A | * | 10/1998 | Kuki | B60L 53/126 |
|   |   |   |   |   | 320/108 |
| 6,157,162 | A | * | 12/2000 | Hayashi | H02J 50/90 |
|   |   |   |   |   | 320/104 |
| 9,770,993 | B2 |   | 9/2017 | Zhao et al. |   |
| 9,987,941 | B2 | * | 6/2018 | Miftakhov | B60L 53/63 |
| 10,065,517 | B1 | * | 9/2018 | Konrardy | B60R 16/0234 |
| 10,076,967 | B2 | * | 9/2018 | Ahmed | H02J 7/025 |
| 10,308,123 | B2 | * | 6/2019 | Beaver | H02J 50/12 |
| 10,391,873 | B2 | * | 8/2019 | Kohnke | G05D 1/0295 |
| 10,411,487 | B2 | * | 9/2019 | Penilla | G01C 21/3484 |

(Continued)

*Primary Examiner* — K. Wong
(74) *Attorney, Agent, or Firm* — Reising Ethington, P.C.

(57) ABSTRACT

A full-service electric vehicle charging station and method of operating the station can provide for efficient and secure vehicle access and movement. The full-service charging station can include a parking area with a charging area; an electric vehicle charger at the charging area; and a full-service charging station server. The full-service charging station server is configured to receive vehicle identification information and a charging confirmation profile from the electric vehicle. The vehicle identification information or the charging confirmation profile includes location information relating to the electric vehicle. Additionally, the full-service charging station server is further configured to disseminate a command profile directly, indirectly, or a combination thereof, to the electric vehicle. The command profile includes a security-based command, a driving command, or both a security-based command and a driving command.

20 Claims, 4 Drawing Sheets

(56) References Cited

U.S. PATENT DOCUMENTS

| 10,549,645 B2* | 2/2020 | Zhao | H02J 7/0029 |
| 2012/0233062 A1* | 9/2012 | Cornish | B60L 53/35 |
| | | | 705/39 |
| 2012/0286730 A1* | 11/2012 | Bonny | B60L 53/14 |
| | | | 320/109 |

* cited by examiner

FULL-SERVICE CHARGING STATION FOR AN ELECTRIC VEHICLE AND METHOD OF OPERATING THE SAME

INTRODUCTION

The field of technology generally relates to rechargeable energy storage systems for electric vehicles and, more particularly, to effectively operating a full-service charging station for electric vehicles.

With a full-service charging station for an electric vehicle, an attendant oftentimes needs to carry keys and manually unlock vehicles that have completed a charge cycle or vehicles that are waiting to be charged. Providing more efficient and secure vehicle access within a full-service charging station environment is desirable.

SUMMARY

According to one embodiment, there is provided a full-service charging station having a parking area with a charging area for use with an electric vehicle, comprising: a parking area including a charging area; an electric vehicle charger at the charging area; and a full-service charging station server, wherein the full-service charging station server is configured to receive vehicle identification information and a charging confirmation profile from the electric vehicle, wherein the vehicle identification information or the charging confirmation profile includes location information relating to the electric vehicle, and wherein the full-service charging station server is further configured to disseminate a command profile directly, indirectly, or a combination thereof, to the electric vehicle, wherein the command profile includes a security-based command, a driving command, or both a security-based command and a driving command.

According to various embodiments, the station may further include any one of the following features or any technically-feasible combination of these features: the charging confirmation profile includes a status indication that charging of the electric vehicle is complete; the command profile includes an external human machine interface (HMI) command for the electric vehicle; after receipt of the status indication that charging of the electric vehicle is complete, the full-service charging station server is configured to disseminate the command profile to a full-service charging station attendant, and wherein the security-based command includes a remote keyless entry command that permits the full-service charging station attendant access to the electric vehicle; the remote keyless entry command is validated when the full-service charging station attendant is within a range of the electric vehicle; the command profile includes a remote keyless entry command that permits the full-service charging station attendant access to a second electric vehicle, wherein the second electric vehicle is parked in a waiting area in the parking area; the security-based command includes a geofence limitation for the electric vehicle; the driving command includes an autonomous driving instruction that is sent directly to the electric vehicle; the full-service station server includes a primary station server, a charging system, and a backend system; a remote keyless entry command request is sent from the primary station server to the backend system; a remote keyless entry command for the command profile is sent from the backend system to the primary station server; the primary station server is configured to disseminate the command profile and receive the charging confirmation profile; the electric vehicle charger is moveable between a plurality of parking spaces in the charging area; the full-service charging station server is further configured to provide location information to a primary user of the electric vehicle; the location information includes a guidance instruction regarding the parking area of the full-service charging station; and/or the location information includes a pick up instruction after charging of the electric vehicle is complete.

According to another embodiment, there is provided a method of operating a full-service charging station for an electric vehicle, the method comprising the steps of: receiving vehicle identification information at a full-service charging station server, wherein the vehicle identification information relates to the electric vehicle; disseminating a command profile directly, indirectly, or a combination thereof, to the electric vehicle, wherein the command profile is disseminated from the full-service charging station server, and wherein the command profile includes a remote keyless entry command for the electric vehicle or an autonomous driving command for the electric vehicle; and receiving, at the full-service charging station server, a charging confirmation profile relating to the electric vehicle. The charging confirmation profile may further include a location and movement status indication.

According to another embodiment, there is provided a method of operating a full-service charging station for an electric vehicle, the method comprising the steps of: receiving location information regarding the electric vehicle when the electric vehicle is parked in a parking area at the full-service charging station; receiving a charging confirmation profile at a full-service charging station server, wherein the charging confirmation profile relates to a charging status of the electric vehicle; and disseminating a command profile directly, indirectly, or a combination thereof, to a second electric vehicle, wherein the command profile relates to a status of the parking area at the full-service charging station. This method may further comprise the step of receiving vehicle identification information at the full-service charging station server, wherein the vehicle identification information relates to the electric vehicle.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The full-service electric vehicle charging station described herein can provide for streamlined management and digital key dissemination to optimize charging efficiency. With a full-service electric vehicle charging station, a primary vehicle user is not required for moving the car to or from the electric vehicle charger. In one example, a primary user drops a vehicle off at the full-service charging station, and an attendant who works for the full-service charging station handles the charging process (e.g., moving the vehicle from a charging area to a waiting area, plugging in the charger, etc.). In another example, the vehicle is autonomously driven between various areas within the charging station, such as from the waiting area to the charging area upon completion of another vehicle being charged. With full-service electric vehicle charging, the attendant needs to carry keys and manually unlock vehicles that have completed a charge cycle and vehicles waiting to be charged. The present embodiments help enable secure and efficient movement of vehicles within a full-service charging environment.

Figure 1:
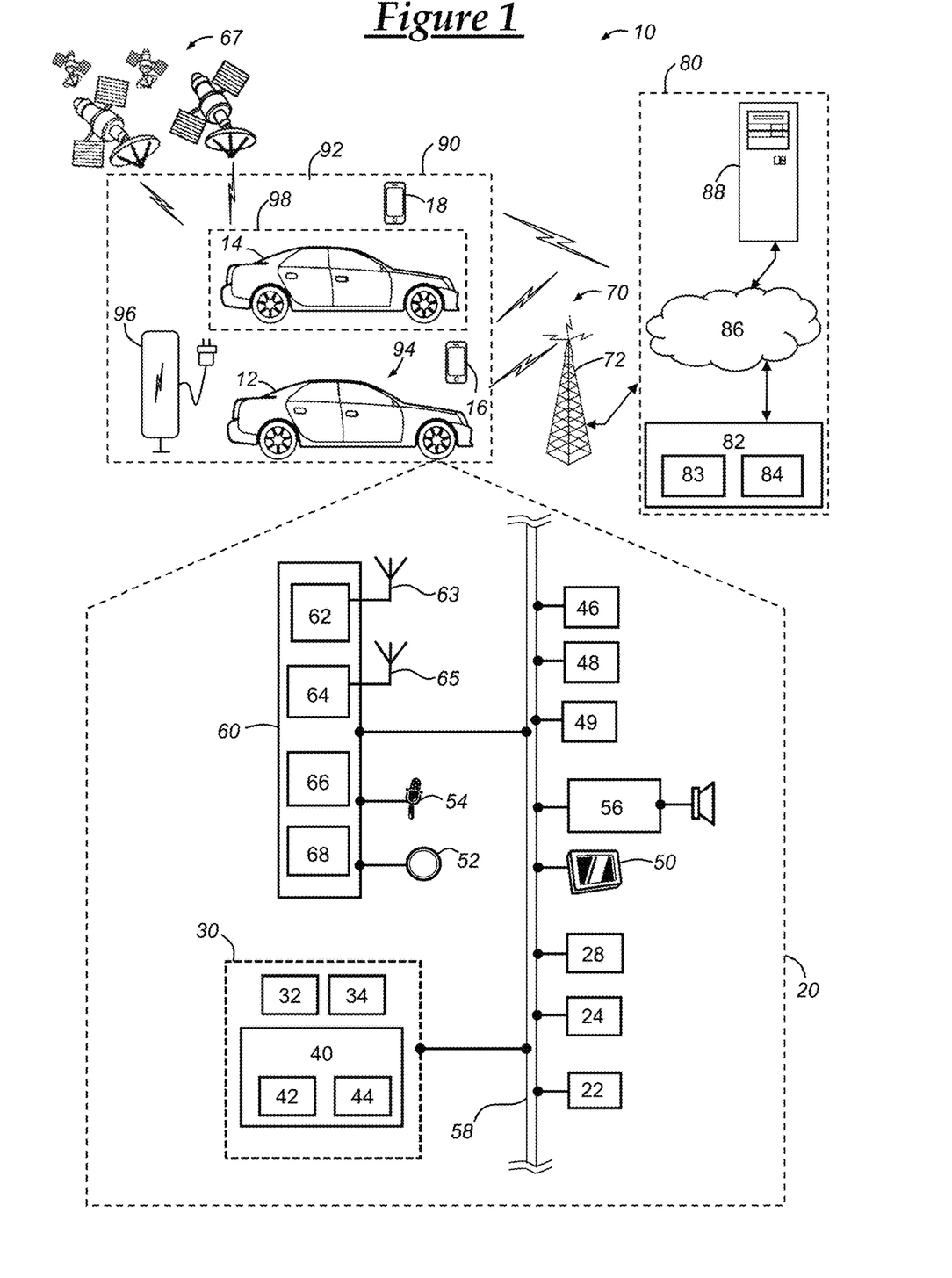
FIG. 1 is a schematic representation of a full-service charging station, operating environment, and a vehicle having a rechargeable energy storage system (RESS)

With reference to FIG. 1, there is shown an operating environment 10 that can be used to implement the methods disclosed herein. Operating environment 10 generally includes a vehicle 12 with vehicle electronics 20, including a rechargeable energy storage system (RESS) 30. Additionally, the operating environment 10 includes a cellular carrier system 70, a full-service charging station server 80, and a full-service charging station 90 for charging the RESS 30. It should be understood that the disclosed method can be used with any number of different systems and is not specifically limited to the operating environment shown here. The following paragraphs provide a brief overview of one such operating environment 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a global navigation satellite system (GNSS) receiver 22, body control module or unit (BCM) 24, other vehicle system modules (VSMs) 28, the RESS 30, controller 40, movement sensor(s) 46, a V2X unit 48, vehicle-user interfaces 50-56, and wireless communication device 60. In the illustrated embodiment, the vehicle 12 is an electric vehicle, such as a battery electric vehicle (BEV), that primarily uses the RESS 30 for propulsion. However, in other embodiments, the vehicle 12 can be a hybrid (e.g., a plug-in hybrid electric vehicle (PHEV)), a fuel cell electric vehicle (FCEV), or another type of electric vehicle. Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the GNSS receiver 22, BCM 24, the RESS 30, controller 40, movement sensor(s) 46, V2X unit 48, vehicle-user interfaces 50-56, and wireless communication device 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 60. One or more VSMs 28 may periodically or occasionally have their software or firmware updated and, in some embodiments, such vehicle updates may be over the air (OTA) updates that are received from a backend system 82 via cellular carrier system 70 and communications device 60. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 67. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 67. The GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the primary vehicle user, or may be used in various control schemes in implementations where the vehicle 12 is autonomous or semi-autonomous. Navigation information may also be used to determine the position of the vehicle 12 with respect to the full-service charging station 90. Navigation information can be presented on the display 50 (or other display within the vehicle such as an application program on mobile device 16) or can be presented verbally such as is done when supplying turn-by-turn navigation. The navigation services can be provided using a dedicated in-vehicle navigation module (which can be part of GNSS receiver 22 and/or incorporated as a part of wireless communications device 60 or other VSM), or some or all navigation services can be done via the vehicle communications device 60 (or other telematics-enabled device) installed in the vehicle, wherein the position or location information is sent to a remote location for purposes of providing the vehicle with navigation maps, map annotations (points of interest, locations of charging stations, etc.), route calculations, and the like. The position information can be supplied to a vehicle backend system 82 or other remote computer system, for other purposes, such as fleet management and/or for use in the operating methods discussed below.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 60. Or, the BCM may be a separate device that is connected to other VSMs via bus 58. BCM 24 may communicate with wireless device 60 and/or one or more vehicle system modules, such as the RESS 30, movement sensor(s) 46, the V2X unit 48, audio system 56, or other VSMs 28. BCM 24 can include a processor and/or memory, which can be similar to processor 42 and memory 44 of the controller 40, or processor 66 and memory 68 of wireless communications device 60, as discussed below. Software stored in the memory and executable by the processor enables the BCM 24 to direct one or more vehicle functions or operations including, for example, controlling external human machine interfaces (HMI) 49. External HMI 49 can include exterior lights of the vehicle 12, auditory cues perceivable from outside the vehicle 12 (e.g., chirps, horn honking, etc.), or other cues that are perceivable from outside the vehicle 12, to potentially help locate the vehicle. Other BCM functionality is possible too, including but not limited to, central locking, air conditioning or other HVAC functions, power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. Further, the BCM 24 may receive data from VSMs to help control various vehicle functionalities.

Additionally, the BCM 24 may provide vehicle state information corresponding to the vehicle state or of certain vehicle components or systems, including the VSMs discussed herein. For example, the BCM 24 may provide the device 60 with battery information from the RESS 30, in the form of a charging confirmation profile, which may indicate that the RESS needs a certain amount of charge, or that the RESS is fully charged, and/or other information regarding the vehicle. The information can be sent to the wireless communications device 60 (or other central vehicle computer) automatically upon receiving a request from the device/computer, automatically upon certain conditions being met, or periodically (e.g., at set time intervals). As discussed in more detail below, the BCM 24 can be configured with one or more triggers that, when a condition is satisfied, the BCM performs some operation, such as activating external HMI 49 or sending vehicle information to the wireless communications device 60 (or to another device or entity, such as the full-service charging station server 80). In this way, the BCM 24 can filter information based on predetermined or predefined triggers and pass the filtered information on to other VSMs, including the RESS 30 or the wireless communications device 60 (or other central vehicle computer).

The RESS 30 can provide energy for propulsion of the vehicle 12, and may be supplemented with one or more engines or motors. The RESS 30 is included as a part of the vehicle electronics 20 and includes an electric battery pack 32, a battery SOC sensor 34, and a controller 40. The RESS 30 may include other components, such as temperature sensors, heating elements, etc. The electric battery pack 32 can be a traction battery or an electric-vehicle battery that is used to provide propulsion for the vehicle 12. As mentioned above, the vehicle 12 can be an electric vehicle or a hybrid electric vehicle and, in such cases, the vehicle 12 can include an electric battery pack 32. A separate lower voltage battery (e.g., 12V) for powering various VSMs and other components of the vehicle electronics 20 may also be included as part of the RESS 30. In one embodiment, the electric battery pack 32 is a lithium-ion battery pack that includes a plurality of lithium-ion batteries. Other types of batteries, such as lead acid, nickel metal hydride, sodium ion, or sodium nickel chloride, to cite a few examples, could be used as appreciated by those skilled in the art.

The battery state of charge (SOC) sensor 34 is an onboard vehicle sensor and can be any of a variety of electrical components that can measure the state of charge of the electric battery pack 32. In one embodiment, the battery SOC sensor 34 can use (or can be) a voltage sensor, such as a dedicated voltmeter that is attached at a positive terminal of the battery pack 32 and at a negative terminal of the battery pack 32. In another embodiment, the battery SOC sensor 34 can use other techniques, such as chemical methodologies that can be used to measure the specific gravity of pH of the electrolytes contained within the battery pack 32, coulomb counting methodologies, Kalman filtering processes (e.g., using voltage and battery temperatures in a Kalman filtering process), pressure methodologies, or a combination thereof. The battery SOC sensor 34 can be configured in various ways, as appreciated by those skilled in the art. The battery SOC sensor 34 can provide sensor information to a computing device of the vehicle 12, such as the controller 40 or wireless communications device 60, for purposes of determining a SOC level, which can be represented as a percentage of the full-charge capacity of the electric battery pack 32.

Controller 40 includes an electronic processor 42 and memory 44, and may be used to create or implement one of the profiles described herein, such as a charging confirmation profile and/or a command profile, as will be detailed below. The controller 40 (control unit, control module, etc.) may be an integrated battery controller or it may be a separate controller. The controller 40 may also be integrated with or otherwise a part of another vehicle system or component, such as the BCM 24. Accordingly, the controller 40 is not limited to any one particular embodiment or arrangement and may be used by the present method to implement or more aspects of the RESS 30.

Processor 42 can be any type of device capable of processing electronic instructions including microprocessors, microcontrollers, host processors, controllers, vehicle communication processors, and application specific integrated circuits (ASICs). It can be a dedicated processor used only for the RESS 30, or it can be shared with other vehicle systems. Processor 42 executes various types of digitally-stored instructions, such as software or firmware programs stored in memory 44. For instance, processor 42 can execute programs or process data to carry out at least a part of the methods discussed herein. Memory 44 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 42 and/or memory 44) can be included in the BCM 24 and/or various other VSMs that typically include such processing/storing capabilities.

The vehicle 12 includes various onboard vehicle sensors, such as the battery SOC sensor 34 and the movement sensors 46. Also, certain vehicle-user interfaces 50-56 can be utilized as onboard vehicle sensors. Generally, the sensors 34, 46 can obtain information pertaining to either the vehicle operating state or the vehicle environmental state. The sensor information can be sent to other VSMs, such as BCM 24, controller 40, and/or the vehicle communications device 60, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The sensors can provide information regarding roadway conditions and features and statuses of areas nearby the vehicle, such as the status of a parking area 92, which can include a charging area 94 near an electric vehicle charger 96, and a waiting area 98, in which a second electric vehicle 14 awaits use of the electric vehicle charger 96 in the charging area 94.

The movement sensors 46 can be used in some implementations to obtain movement and/or inertial information concerning the vehicle 12, such as vehicle speed, acceleration, yaw (and yaw rate), pitch, roll, and various other attributes of the vehicle concerning its movement as measured locally through use of onboard vehicle sensors. The movement sensors 46 can be mounted on the vehicle 12 in a variety of locations, such as within an interior vehicle cabin, on a front or back bumper of the vehicle, and/or on the hood of the vehicle 12. The movement sensors 46 can be coupled to various other VSMs directly or via communications bus 58. Movement sensor data can be obtained and sent to the other VSMs, including BCM 24, controller 40, and/or wireless communications device 60. The vehicle 12 can also include other sensors not mentioned above, including ranging sensors (i.e., sensors used to detect the range between the vehicle and another object, such as through use of radar or lidar), other radars, other lidars, cameras, parking sensors, lane change and/or blind spot sensors, lane assist sensors, tire-pressure sensors, fluid level sensors (including a fuel level sensor), etc.

The V2X unit 48 provides data relating to other vehicles, infrastructure, etc. near the host vehicle 12. The V2X unit 48 may receive and/or send wireless messages over an inter-vehicle communication network, such as a dedicated short range communication (DSRC) or cellular protocol. The wireless messages may be transmitted as a standard periodic beacon message that includes data relating to vehicle positions, vehicle kinematics/dynamic parameters such as speed values or data relating to speed values, or traffic or road events sensed by respective target or remote vehicles. The V2X unit 48 may be able to provide information about remote vehicles, such as a second vehicle 14 that is waiting to be charged at the electric vehicle charger 96. The V2X unit 48 may be V2V (vehicle-to-vehicle) capable, V2I (vehicle-to-infrastructure) capable, and/or V2P (vehicle-to-pedestrian) capable. In an advantageous embodiment, vehicle identification information (e.g., a vehicle identification number or VIN) is sent from the vehicle 12 to the full-service charging station server 80 using the V2X unit 48. Although the V2X unit 48 is schematically illustrated as a separate unit, it is possible for this unit or elements thereof to be integrated into some other unit, device, module, system, etc., such as the wireless communications device 60, a telematics unit or an active safety module, to cite a few examples.

Wireless communications device 60 is capable of communicating data via short-range wireless communications (SRWC) and/or via cellular network communications through use of a SRWC circuit 62 and a cellular chipset 64, as depicted in the illustrated embodiment. In one embodiment, the wireless communications device 60 is a central vehicle computer that may be used to carry out at least part of the method discussed below. In the illustrated embodiment, wireless communications device 60 includes an SRWC circuit 62, a cellular chipset 64, a processor 66, memory 68, and antennas 63 and 65. In one embodiment, wireless communications device 60 may be a standalone module or, in other embodiments, device 60 may be incorporated or included as a part of one or more other vehicle system modules, such as a center stack module (CSM), BCM 24, an infotainment module, a head unit, and/or a gateway module. In some embodiments, the device 60 can be implemented as an OEM-installed (embedded) or aftermarket device that is installed in the vehicle. In some embodiments, the wireless communications device 60 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 60 are directly connected to one another as opposed to being connected via communications bus 58.

In some embodiments, the wireless communications device 60 can be configured to communicate wirelessly according to one or more short-range wireless communications (SRWC) such as any of the Wi-Fi™, WiMAX™, Wi-Fi Direct™ other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 62 enables the wireless communications device 60 to transmit and receive SRWC signals, such as BLE signals. The SRWC circuit 62 may allow the device 60 to connect to another SRWC device. Additionally, in some embodiments, the wireless communications device may contain a cellular chipset 64 thereby allowing the device to communicate via one or more cellular protocols, such as those used by cellular carrier system 70.

Wireless communications device 60 may enable vehicle 12 to be in communication with one or more remote networks (e.g., one or more networks associated with the full-service charging station server 80) via packet-switched data communication. This packet-switched data communication may be carried out through use of a non-vehicle wireless access point that is connected to a land network via a router or modem. When used for packet-switched data communication such as TCP/IP, the communications device 60 can be configured with a static IP address or can be set up to automatically receive an assigned IP address from another device on the network such as a router or from a network address server.

Packet-switched data communications may also be carried out via use of a cellular network that may be accessible by the device 60. Communications device 60 may, via cellular chipset 64, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The wireless communications device 60 is connected to the bus 58, and can receive sensor data from one or more onboard vehicle sensors 34, 46 and, thereafter, the vehicle 12 can send this data (or other data derived from or based on this data) to other devices or networks, including the off-board full-service charging station server 80 or the on-board controller 40. And, in another embodiment, the wireless communications device 60 can be incorporated with or at least connected to a navigation system that includes geographical map information including geographical roadway map data. The geographical map information may include, in some embodiments, locations of fast charging stations such as the charging station 90.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-56 are also onboard vehicle sensors that can receive input from a user or other sensory information. The pushbutton(s) 52 allow manual user input into the communications device 60 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 60 to enable the driver or other occupant to provide voice commands and/or carry out hands-free calling via the wireless carrier system 70. For this purpose, it can be connected to an on-board automated voice processing unit utilizing human machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, such as the mobile device 16, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): land networks, cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with a land network or to connect the wireless carrier system with user equipment (UEs, e.g., which can include telematics equipment in vehicle 12). Carrier system 70 can implement any suitable communications technology, including GSM/ GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

The full-service charging station server 80 helps facilitate various processes relating to operation of the full-service charging station 90. In one embodiment, the full-service charging station server 80 is a distributed network comprising a backend system 82, a charging system 86, and a primary station server 88. In some embodiments, all processing done by the full-service charging station server 80 is accomplished remote from the full-service charging station 90. In other embodiments, all processing done by the full-service charging station server 80 is accomplished locally at the full-service charging station 90. In yet other embodiments, some processing is accomplished locally, while some processing is accomplished remotely.

Vehicle backend system 82 is located at a physical location that is located remotely from vehicle 12 and the full-service charging station 90. The vehicle backend system 82 may be designed to provide the vehicle electronics 20 with a number of different system back-end functions through use of one or more electronic servers 83 and, in many cases, facilitates digital key dissemination and vehicle access at the full-service charging station 90. The vehicle backend system 82 includes vehicle backend servers 83 and databases 84, which may be stored on a plurality of memory devices. Vehicle backend system 82 may include any or all of these various components and, preferably, each of the various components are coupled to one another via a wired or wireless local area network. Backend system 82 may receive and transmit data via a modem connected to a land network associated with the wireless carrier system 70. Data transmissions may also be conducted by wireless systems, such as IEEE 802.11x, GPRS, and the like. Those skilled in the art will appreciate that, although only one backend system 82, charging system 86, and primary station server 88 are depicted in the illustrated embodiment, numerous systems or servers may be used. Moreover, a plurality of systems or servers can be geographically distributed, cloud-based, etc., and can each coordinate information and services with one another, as those skilled in the art will appreciate.

Servers 83, 88 can be computers or other computing devices that include at least one processor and that include memory. Additionally, the charging system 86 may be considered a separate server, such as a cloud-based server, and may also include the various components described with respect to servers 83, 88. The processors can be any type of device capable of processing electronic instructions including microprocessors, microcontrollers, host processors, controllers, vehicle communication processors, and application specific integrated circuits (ASICs). The processors can be dedicated processors used only for servers 83, 88 or can be shared with other systems. The at least one processor can execute various types of digitally-stored instructions, such as software or firmware, which enable the servers 83, 88 to provide a wide variety of services. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 83, 88 to connect with one another, databases 84, or other networking devices, including routers, modems, and/or switches. In one particular embodiment, the NICs (including WNICs) of servers 83, 88 may allow SRWC connections to be established and/or may include Ethernet (IEEE 802.3) ports to which Ethernet cables may be connected to that can provide for a data connection between two or more devices. Backend system 82, charging system 86, and/or the primary station server 88 can include a number of routers, modems, switches, or other network devices that can be used to provide networking capabilities, such as connecting with a land network and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend system 82 can store various information, such as digital key information for the vehicles 12, 14, a database containing location related information for charging stations, a fleet database containing information for autonomous, semi-autonomous, or non-autonomous vehicle back-office schedules, as well as other vehicle information database(s). Additionally, it is possible for separate databases to be included with or associated with the charging system 86 and/or the primary station server 88.

The full-service charging station 90 can be used to charge the RESS 30 of the vehicle 12. The charging station 90 can be a DC fast charge (DCFC) station that connects the RESS to the main power grid through an external charger 96. In such an embodiment, the energy transfer output is about 50-120 kW; however, other charger types and energy transfer outputs are possible, and may vary depending on the type of charging station. The full-service charging station 90 includes a parking area 92, which in some embodiments, can be subdivided into a charging area 94 and a waiting area 98.

Figure 2:
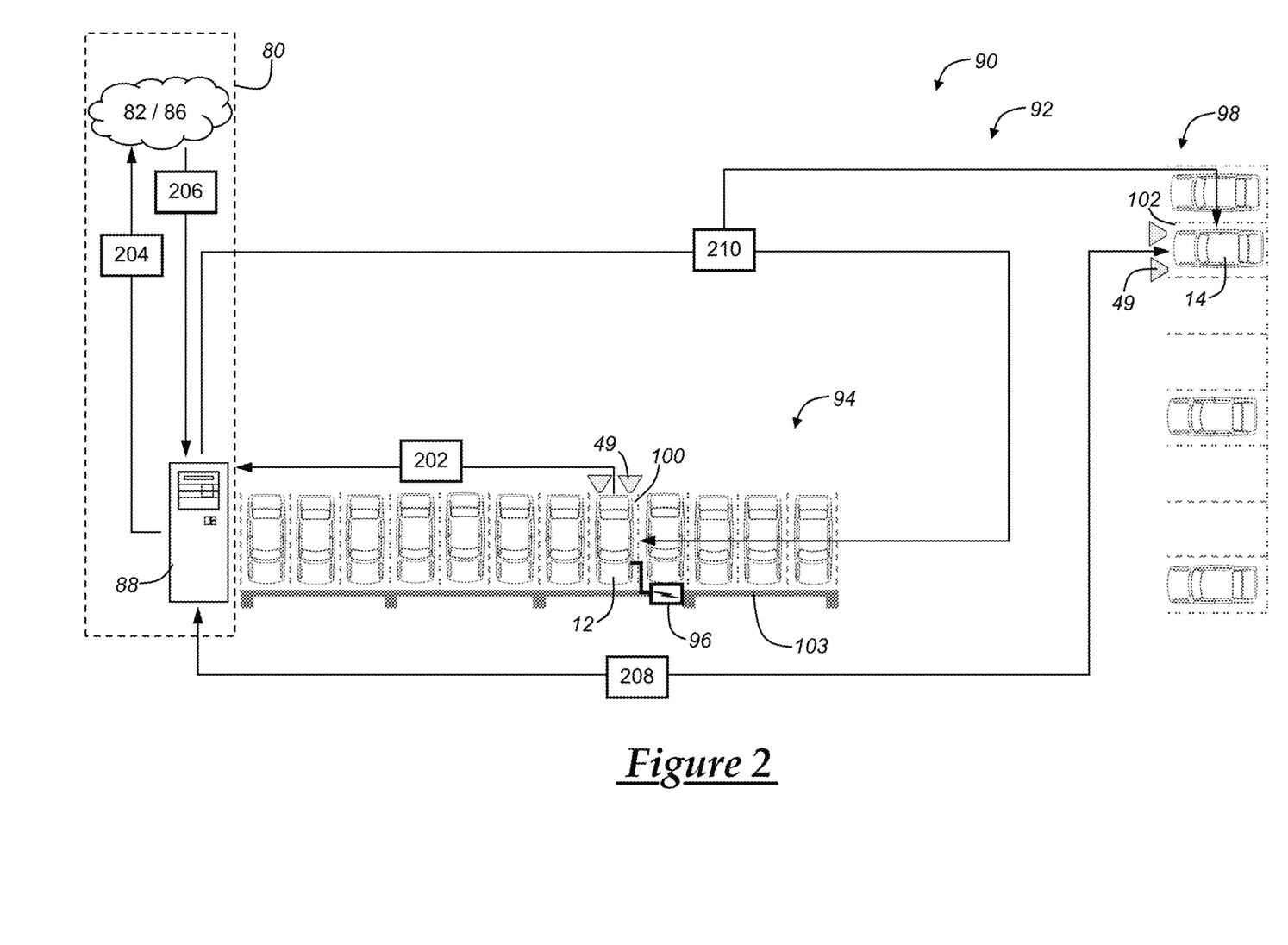
FIG. 2 is a flowchart and schematic representation of a full-service charging station.

FIG. 2 schematically illustrates an embodiment of a full-service charging station 90 having a parking area 92 that is subdivided into a charging area 94 and a waiting area 98. The parking area 92 includes a plurality of parking spaces 100, 102 (only two are labeled for clarity purposes), with the parking space 100 being located in the charging area 94, and the parking space 102 being located in the waiting area 98. In the charging area 94, a moveable charger 96 is slidably mounted along a track 103. During operation, the charger 96 is translatable along the track 103 to charge the vehicles, such as vehicle 12, in a 1-to-N style, as described in U.S. Pat. No. 9,770,993, assigned to the present Applicant, and incorporated by reference herein, in its entirety. While other implementations for the charger 96 are possible, the methods and systems described herein may allow for more efficient operation in this type of moveable charger system.

In the illustrated embodiments, the full-service charging station 90 has a separate waiting area 98 for vehicles, such as the vehicle 14, to park and wait until there is availability in the charging area 94. However, it is possible for the parking area 92 to not have a distinct or separate waiting area 98, such that the charging area 94 takes up the entirety of the parking area 92. For example, in one embodiment, the vehicle 12 may be autonomously driven to the charging area 94 when the parking space 100 is free. Upon charge completion, the second electric vehicle 14 may be autonomously driven from off-site to replace the vehicle 12 in the parking space 100. Other example operational schemes are detailed further below.

The full-service charging station 90 can have varying configurations for the full-service charging station server 80. In the illustrated embodiments, the primary station server 88 of the full-service service charging station server 80 is located at the station 90, and the backend system 82 and/or the charging system 86 are cloud-based or operated via a backend facility (e.g., backend system 82 can be a distinct call center, backend facility, or the like, equipped with one or more servers of its own, while charging system 86 is cloud-based). In some embodiments, the full-service charging station server 80 may be entirely located at the station 90, or instead, could be entirely located remote from the station 90, or as illustrated herein, some combination of both. In FIG. 2, the backend system 82 and the charging system 86 are operated within the same cloud-based network, where as the backend system 82 and the charging system 86 are operated separately in the embodiments illustrated in FIGS. 3 and 4. Other connection schemes, configurations, etc. are certainly possible with respect to the full-service charging station server 80.

Figure 3:
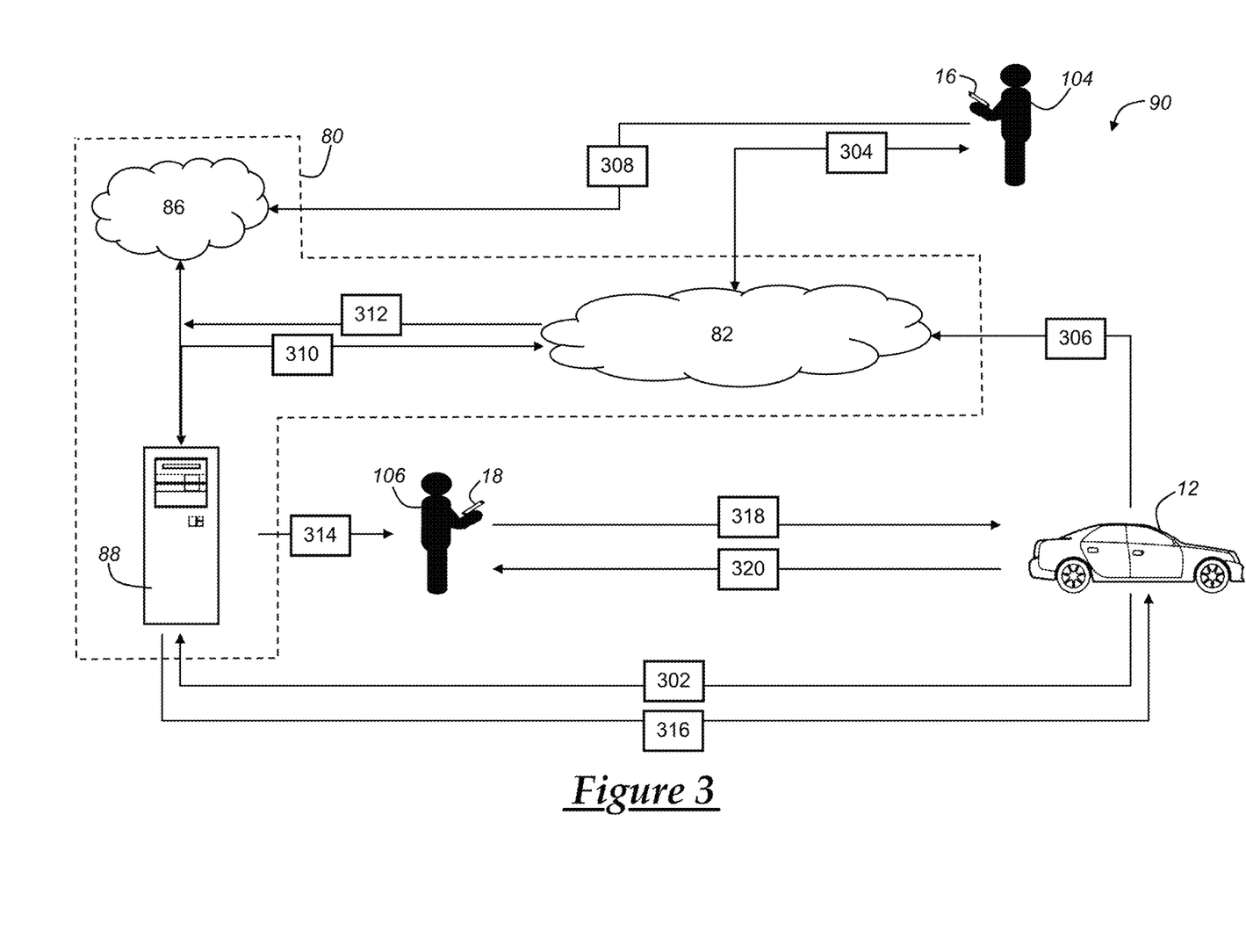
FIG. 3 is a flowchart and schematic representation of one embodiment of operating a full-service charging station, such as the charging stations illustrated in FIGS. 1 and 2.
Figure 4:
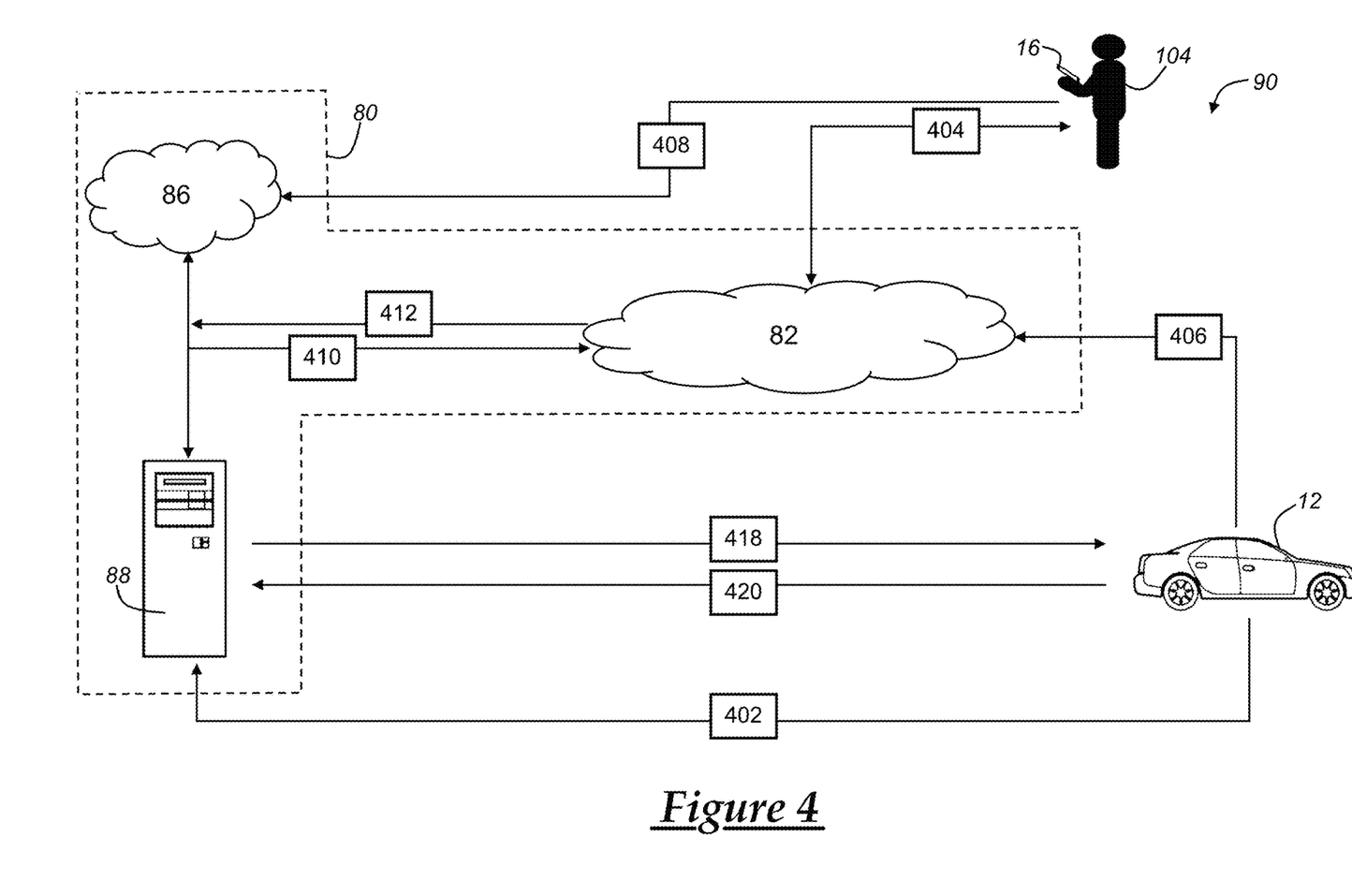
FIG. 4 is a flowchart and schematic representation of another embodiment of operating a full-service charging station, such as the charging stations illustrated in FIGS. 1 and 2.

FIGS. 2-4 also schematically show methods of operating a full-service charging station 90 in accordance with various embodiments. The full-service aspect of the charging station differs from more typical charging stations that require a primary user of the vehicle (e.g., an owner or a main driver or passenger in the vehicle 12) to get out from the vehicle and manually plug it in, for example. In a full-service environment, the charger itself could be autonomously operated, or an attendant (e.g., an employee of the full-service charging station 90 that assists the primary user of the vehicle), may help facilitate one or more aspects of the charging process. Additionally, it is possible for the vehicles to be directed autonomously or semi-autonomously in the full-service charging station 90. The methods schematically illustrated in FIGS. 2-4 could be implemented with other full-service charging station configurations, layouts, schemes, etc., that are different than what is particularly illustrated herein. Accordingly, while the description uses the operating environment 10 and full-service charging station 90 as examples for context, other operating environments and charging station types may be suitable.

FIG. 2 provides a summary overview of one embodiment of operating a full-service charging station 90. Block 202 represents a charging confirmation profile that is sent from the first electric vehicle 12 to the full-service charging station server 80, or more particularly in this embodiment, to the primary station server 88. In an advantageous embodiment, the V2X unit 48 of the electric vehicle 12 is used to transmit the charging confirmation profile. In some embodiments, the charging confirmation profile includes a status indication that charging of the electric vehicle 12 is complete. In some embodiments, the charging confirmation profile may be sent by the vehicle 12 upon entry into the full-service charging station 90 or when an application program on the primary user's mobile device 16 indicates that the vehicle 12 needs to be charged. The charging confirmation profile may include the vehicle identification information (e.g., a VIN for the vehicle 12). Or, instead of being sent together with the charging confirmation profile, in some embodiments, the vehicle identification information may be sent separately. The charging confirmation profile may include a current SOC of the RESS 30, as measured, for example, by the battery SOC sensor 34. One charging confirmation profile may be sent to the server 80, which can then be updated as the charging amount changes, for example, or multiple charging confirmation profiles may be sent. The charging confirmation profile can accordingly be used for various purposes, such as developing an availability estimate for parking space 100, or advantageously, for requesting digital keys and/or triggering dissemination of a command profile, as detailed below.

When the charging confirmation profile indicates that the vehicle 12 is sufficiently charged (e.g., charging with the charger 96 is completed), a request can be sent by the primary station server 88 to the backend system 82 and/or the charging system 86 to obtain digital keys for the vehicles 12, 14, as represented by block 204. Then, the backend system 82 and/or the charging system 86 can distribute the digital keys for the vehicles 12, 14, to the primary station server 88, as represented by block 206. Digital keys, as described herein, include a remote keyless entry command (e.g., a security-based command, which is detailed further below). The distribution between various devices relating to the full-service charging station server 80 may vary from what is particularly illustrated. For example, it is possible for digital keys to be directly distributed from the backend system 82 and/or the charging system 86 to an attendant's mobile device 18 (shown in FIG. 3), or for a command profile, detailed below, to be directly disseminated to one or more vehicles 12, 14.

Continuing with the embodiment illustrated in FIG. 2, the full-service charging station server 80, or more particularly, the primary station server 88, can be configured to locate the vehicle 14 and/or the vehicle 12, as represented by block 208. This step can be accomplished, in one embodiment, by activating external HMI 49. In one embodiment, this involves turning on the headlights or taillights to make the vehicles 12, 14 more visually apparent to a full-service charging station attendant. In some embodiments, an auditory cue such as a horn or chirps may be used to make the vehicles 12, 14 more auditorily apparent to the full-service charging station attendant. Activation of the external HMI 49 may be at least partially dependent on the position or location information relating to the vehicles 12, 14. For example, only the taillights are activated for the vehicle 12, as it may be more likely that an attendant will view the taillights of the vehicle 12 given its parking orientation in the spot 100. In some embodiments, activation of external HMI 49 may not be necessary, as a driving command may be used to autonomously operate the vehicles 12, 14 after the vehicle 12 is sufficiently charged. Activation of the external HMI 49 may be part of a command profile, that is detailed further below.

As represented by block 210, the full-service charging station server 80, or more particularly, the primary station server 88 is configured to disseminate a command profile. The command profile may include a security-based command and/or a driving command. In one example, the requested and received digital keys (blocks 204, 206) are sent from the primary station server 88 in the form of a security-based command (e.g., a remote keyless entry command). This can allow the full-service charging station attendant, for example, to use the mobile device 18 (detailed further below) with a smartphone access app to connect to the vehicle 12, 14, validate the digital key, and access the vehicle 12, 14. Accordingly, this indirect command profile dissemination allows the attendant to access the vehicles 12, 14.

The command profile can also include other security-based commands. In one example, a geofence limitation is used to limit the driving range of the vehicles 12, 14. The geofence limitation is a security-based command that only allows the vehicle to be operated within a certain range (e.g., within the confines of the parking area 92). Accordingly, if a full-service charging station attendant was to attempt to drive the vehicle 12 off of the premises of the full-service charging station 90, the vehicle 12 would be disabled outside the limit of the geofence. In another example, the security-based commands may include a particular validation range for the remote keyless entry command (e.g., the digital key will only be validated if the mobile device 18 is within 5 or 10 feet of the vehicle).

In some embodiments, the command profile disseminated with respect to block 210 includes a driving command. The driving command may be an autonomous driving instruction sent directly to one or both vehicles 12, 14. For example, when the charging confirmation profile indicates that the vehicle 12 is sufficiently charged, an autonomous driving instruction can be sent to the first vehicle 12 to cause the vehicle to be moved away from spot 100, into the waiting area 98 for example. Meanwhile, another autonomous driving instruction can be sent to the vehicle 14, to cause the second vehicle to be moved out of the spot 102 in the waiting area 98, to the spot 100 in the charging area 94, so it can be charged in accordance with the 1-to-N charging scheme facilitated by the moveable charger 96. In another example, the driving commands can include a speed limitation, so that the vehicles 12, 14 cannot be operated above a particular speed threshold (e.g., 25 mph). Integration between the dissemination of the command profile and the charging confirmation profile allows for more secure vehicle access and digital key distribution, along with more efficient operation of the full-service charging station 90.

The command profile may also include instructions for after the vehicles 12, 14 are moved. For example, once the vehicles 12, 14 are switched such that the fully charged vehicle 12 is in the waiting area 98 and the vehicle 14 is in the charging area 94, the doors of each vehicle can be automatically locked, for example, by using a security-based command sent to the BCM 24. Additionally, the digital key can be purged from the attendant's mobile device (e.g., mobile device 18), and an immobilizer can be set to prevent use of either vehicle 12, 14. Thus, digital key purging and setting the immobilizer may also be included as security-based commands of the command profile.

FIG. 3 illustrates an attendant-based implementation of a method of operating the full-service charging station 90. As described above, a primary user 104 of the vehicle 12 can be assisted by the full-service charging station attendant 106, who works for the full-service charging station 90. While described in the context of one primary vehicle user 104 and one attendant 106, it is possible to operate the station 90 with multiple users and attendants, and the distribution of various instructions, commands, etc. can be divided appropriately.

According to one embodiment, the vehicle 12 entering the full-service charging station 90 communicates its VIN to the full-service charging station server 80, as represented by block 302. This may be accomplished with the V2X unit 48. In one embodiment, as shown in FIG. 3 at block 304, an in-vehicle application program on the mobile device 16 of the primary user 104 provides guidance instructions and gathers customer information. The guidance instructions, for example, could indicate whether the vehicle 12 should be directed to the charging area 94 or the waiting area 98. This information could be transmitted back and forth between the backend system 82 and the mobile device 16. The customer information can be part of the charging confirmation profile, which is sent from the vehicle 12, as represented by block 306. This information can be used by the backend system 82 and/or the charging system 86, along with a charging itinerary that may be sent to the charging system 86, as represented by block 308. The charging itinerary may include a desired SOC for the battery pack 32, or a certain time or duration that the primary user 104 plans to leave the vehicle 12 at the full-service charging station 90.

Upon receipt of the vehicle identification information and/or the charging confirmation profile, digital keys (i.e., a remote keyless entry command) can be requested from the primary station server 88, as represented by block 310, and the digital key for vehicle 12 can be sent from the issuing authority (e.g., backend system 82 and/or charging system 86) to the primary station server 88, as represented by block 312. In some embodiments, the primary station server 88 sends a notification to the attendant 106. This can be in the form of an instant reservation when the vehicle 12 needs attention. The instant reservation, along with a command profile, can be sent to the attendant 106, as represented by block 314. This command profile advantageously includes digital access keys (e.g., a security-based command in the form of a remote keyless entry command) for the vehicle 12, along with a second vehicle, such as vehicle 14, if the second vehicle is waiting to be moved into the spot occupied by the vehicle 12. The command profile may also include activating the external HMI 49 of the vehicle 12, as represented by block 316, so the attendant 106 can more easily locate the vehicle 12.

With regard to blocks 318, 320 an application on the mobile device 18 of the attendant 106 may facilitate communication with the vehicle 12, such as with the wireless communication device 60. In some embodiments, block 318 represents a connection request between the mobile device 18 of the attendant and the vehicle 12. The command profile can then provide credential validation, vehicle access control, and/or immobilization after moving the vehicle 12 is complete. As represented by block 320, confirmation regarding the vehicle 12 may be sent from the vehicle 12 to the mobile device 18 of the attendant 106. In some embodiments, the remote keyless entry command is validated before the attendant 106 is permitted access to the vehicle 12. This can increase security for the primary user 104, as well as increasing ease of operation for the attendant 106, as he or she does not need to carry around physical keys for a number of vehicles at the full-service charging station 90.

FIG. 4 shows an embodiment where autonomous driving is used to control operation of the vehicle 12, instead of the attendant 106 shown in FIG. 3. However, it should be understood that the methods and charging stations of FIGS. 3 and 4 are not mutually exclusive. For example, some vehicles in the full-service charging station 90 may be autonomously controlled, while some could be attendant controlled. Further, it is possible for the primary user 104 of the vehicle 12 to remain in the vehicle 12 during the charging process. However, given the full-service aspect of the charging station 90, the primary user 104 does not need to facilitate movement of the vehicle within the charging station 90. Moreover, the charger 96 may be adapted to automatically move to and charge the vehicle 12, as described above. Accordingly, the movable charger 96 may be more desirable for autonomous-based application.

In one embodiment of FIG. 4, as with FIG. 3, the vehicle 12 entering the full-service charging station 90 communicates its VIN to the full-service charging station server 80, as represented by block 402. This may be accomplished with the V2X unit 48. In one embodiment, as shown in FIG. 4, at block 404, an in-vehicle application program on the mobile device 16 of the primary user 104 provides guidance instructions and gathers customer information. The guidance instructions, for example, could indicate whether the vehicle 12 should be directed to the charging area 94 or the waiting area 98. This information could be transmitted back and forth between the backend system 82 and the mobile device 16. The customer information can be part of the charging confirmation profile, which is sent from the vehicle 12, as represented by block 406. This information can be used by the backend system 82 and/or the charging system 86, along with a charging itinerary that may be sent to the charging system 86, as represented by block 408. The charging itinerary may include a desired SOC for the battery pack 32, or a certain time or duration that the primary user 104 plans to leave the vehicle 12 at the full-service charging station 90.

Upon receipt of the vehicle identification information and/or the charging confirmation profile, digital keys (i.e., a remote keyless entry command) can be requested from the primary station server 88, as represented by block 410, and the digital key for vehicle 12 can be sent from the issuing authority (e.g., backend system 82 and/or charging system 86) to the primary station server 88, as represented by block 412. In this embodiment, since there is not an attendant involved, the digital key/remote keyless entry command provides vehicle access control and can override an immobilizer. The full-service charging station server 80, or more particularly, the primary station server 88, can be configured to send a command profile directly to the electric vehicle 12, as represented by block 418. In this embodiment, the command profile advantageously includes a driving command in the form of an autonomous driving instruction with a path plan to route the vehicle 12 within the full-service charging station 90. Accordingly, in an advantageous embodiment, the command profile includes credential validation, vehicle access control (e.g., a remote keyless entry command), an autonomous driving instruction, a path plan, as well as an immobilization command. In return, as represented by block 420, the vehicle 12 can send back a command profile acknowledgement. The vehicle 12 can also send back its location and movement status to the full-service charging station server 80. In an advantageous embodiment (applicable to FIG. 3 or FIG. 4, for example), the location status of the vehicle 12 may be transmitted from the full-service charging station server 80 to the primary user 104, so the user can monitor the vehicle's position and/or have an indication of where the vehicle is to be picked up from (i.e., a pickup instruction).

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A full-service charging station having a parking area with a charging area for use with an electric vehicle, comprising:
   an electric vehicle charger at the charging area; and
   a full-service charging station server, wherein the full-service charging station server is configured to receive vehicle identification information and a charging confirmation profile from the electric vehicle, wherein the vehicle identification information or the charging confirmation profile includes location information relating to the electric vehicle, and
   wherein the full-service charging station server is further configured to disseminate a command profile directly, indirectly, or a combination thereof, to the electric vehicle, wherein the command profile includes a security-based command or both the security-based command and a driving command, wherein the security-based command includes a remote keyless entry command that permits a full-service charging station attendant access to the electric vehicle.

2. The full-service charging station of claim 1, wherein the charging confirmation profile includes a status indication that charging of the electric vehicle is complete.

3. The full-service charging station of claim 2, wherein the command profile includes an external human machine interface (HMI) command for the electric vehicle.

4. The full-service charging station of claim 2, wherein after receipt of the status indication that charging of the electric vehicle is complete, the full-service charging station server is configured to disseminate the command profile to the full-service charging station attendant.

5. The full-service charging station of claim 4, wherein the remote keyless entry command is validated when the full-service charging station attendant is within a range of the electric vehicle.

6. The full-service charging station of claim 4, wherein the command profile includes a second remote keyless entry command that permits the full-service charging station attendant access to a second electric vehicle, wherein the second electric vehicle is parked in a waiting area in the parking area.

7. The full-service charging station of claim 4, wherein the security-based command includes a geofence limitation for the electric vehicle.

8. The full-service charging station of claim 1, wherein the driving command includes an autonomous driving instruction that is sent directly to the electric vehicle.

9. The full-service charging station of claim 1, wherein the full-service station server includes a primary station server, a charging system, and a backend system.

10. The full-service charging station of claim 9, wherein a remote keyless entry command request is sent from the primary station server to the backend system.

11. The full-service charging station of claim 10, wherein the remote keyless entry command for the command profile is sent from the backend system to the primary station server.

12. The full-service charging station of claim 9, wherein the primary station server is configured to disseminate the command profile and receive the charging confirmation profile.

13. The full-service charging station of claim 1, wherein the electric vehicle charger is moveable between a plurality of parking spaces in the charging area.

14. The full-service charging station of claim 1, wherein the full-service charging station server is further configured to provide location information to a primary user of the electric vehicle.

15. The full-service charging station of claim 14, wherein the location information includes a guidance instruction regarding the parking area of the full-service charging station.

16. The full-service charging station of claim 14, wherein the location information includes a pick up instruction after charging of the electric vehicle is complete.

17. A method of operating a full-service charging station for an electric vehicle, the method comprising the steps of:
   receiving vehicle identification information at a full-service charging station server, wherein the vehicle identification information relates to the electric vehicle;
   disseminating a command profile directly, indirectly, or a combination thereof, to the electric vehicle, wherein the command profile is disseminated from the full-service charging station server, and wherein the command profile includes a remote keyless entry command for the electric vehicle; and
   receiving, at the full-service charging station server, a charging confirmation profile relating to the electric vehicle.

18. The method of claim 17, wherein the charging confirmation profile includes a location and movement status indication.

19. A method of operating a full-service charging station for an electric vehicle, the method comprising the steps of:
   receiving location information regarding the electric vehicle when the electric vehicle is parked in a parking area at the full-service charging station;

receiving a charging confirmation profile at a full-service charging station server, wherein the charging confirmation profile relates to a charging status of the electric vehicle; and disseminating a command profile directly, indirectly, or a combination thereof, to a second electric vehicle, wherein the command profile relates to a status of the parking area at the full-service charging station.

20. The method of claim 19, further comprising the step of receiving vehicle identification information at the full-service charging station server, wherein the vehicle identification information relates to the electric vehicle.

* * * * *